W. F. GOODWIN.
Harvester Rake.
No. 62,838.
Patented March 12, 1867.
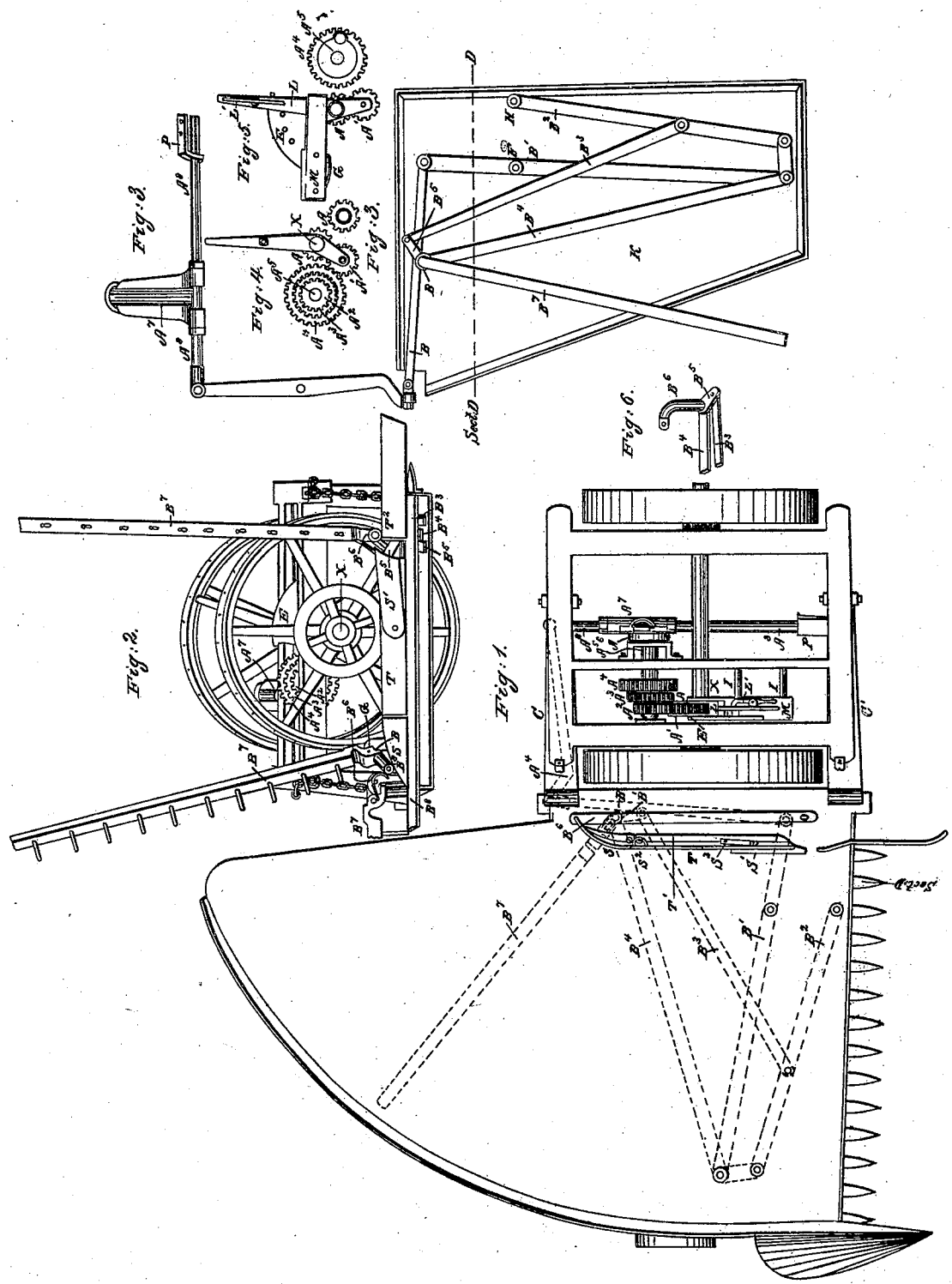

United States Patent Office.

WILLIAM F. GOODWIN, OF WASHINGTON, DISTRICT OF COLUMBIA.

Letters Patent No. 62,838, dated March 12, 1867.

IMPROVEMENT IN HARVESTER RAKES.

The Schedule referred to in these Letters Patent and making part of the same.

TO ALL WHOM IT MAY CONCERN:

Be it known that I, WILLIAM F. GOODWIN, of the city and county of Washington, and District of Columbia, have invented certain new and useful improvements in the Mechanism for Operating Harvester Rakes; and I do hereby declare the following to be a full, clear, and exact description of the nature, construction, and operation of the same, references being had to the accompanying drawings, which are made part of this specification, and in which—

Figure 1 is a top view, looking from above, showing a plan of a harvester embodying my improvement. The position of the apparatus working under and in the platform, and the vibrating arm $A^9$, under the rear connecting-bar C, is indicated by dotted lines in red, and fully exposed and shown in fig. 3.

Figure 2 is a side view of the same, having a part of the platform cut away, showing a section through the box or recess K under the platform, in which the bars B $B^1$ $B^2$ $B^3$ and $B^4$ are operated, and also showing the different positions of the rake, and the means by which it is elevated and depressed.

Figure 3 is a view of the box or recess K, having the platform removed, showing the bars B $B^1$ $B^2$ $B^3$ and $B^4$, crank $B^5$, post $B^6$, with the rake $B^7$ attached, and also showing the connection of the yoke $A^7$ with the sliding-rod $A^8$, which connects with the vibrating arm $A^9$, which also connects with the bar or link B.

Figure 4 is a detached view of the pinions A and $A^1$, and lever L, and gear-wheels $A^2$ $A^3$ and $A^4$, representing the pinion $A^1$ in gear with the large gear-wheel $A^4$.

Figure 5 is a detached view of the same, showing the opposite side of the lever L, with the lever $L^1$ attached, and showing the sliding-block M, with its circular flange or projection E, and also showing the end of the shaft $A^5$, and its crank $A^6$. This figure represents the pinion $A^1$ out of gear.

Figure 6 is a detached view of the crank $B^5$, and post $B^6$, attached to the ends of the bars $B^3$ and $B^4$.

Similar letters of reference indicate corresponding parts in the several figures.

This improvement relates to mechanism for operating the rake, for the purpose of raking grain from the platform of reaping machines. The apparatus is attached to and travels with the harvester, and is operated by the driving-wheels of the same by means of the pinion A on the axle $x$, which is thrown in and out of gear with the apparatus which drives the rake. By this apparatus the grain is raked from the platform and deposited on the ground in gavels sufficiently large to form a sheaf. The construction is simple, and can be attached to different varieties of reaping machines.

To enable others skilled in the art to which my invention appertains to fully understand and use the same, I will proceed to describe it, in connection with the accompanying drawings.

The platform is constructed to permit the grain to be swept off at one side, the gavel being delivered on the ground in rear of the driving-wheels. The apparatus for operating the rake is mounted partly on the frame of the reaping machine and partly under the platform, in a box or recess made to receive it, and partly on the side of the platform next to the driving-wheel. The shape of the platform being curvilinear, the movements of the rake are made to correspond therewith. As this application has exclusive reference to the devices by which the rake is operated, I will limit the description to such devices, and refer to parts of the reaping apparatus only by way of elucidation. The gear-wheel A has a tongue or key projecting inwardly in the hole, which fits over the axle $x$. The wheel A is placed between the jaws of the lever L, and both are placed on the axle $x$ by passing them over the end of the same and moving them to their proper place. The axle $x$ has a groove or key-seat cut lengthwise in one side, to receive the tongue in the wheel A. The tongue is made to fit loosely in the groove, so as to permit the wheel A to be shifted on the axle, which changes the movements of the rake. The groove is cut in the axle sufficiently long to permit the wheel A to be moved to points opposite to the three different gear-wheels $A^2$ $A^3$ and $A^4$, so as to permit the pinion $A^1$ to be geared with either of them at the will of the operator. The pinion $A^1$ is placed between the jaws of the lever L, in gear with the wheel A. The pinion $A^1$ has its journals in the end of the lever L, which is pivoted on the axle $x$, and serves to throw the pinion $A^1$ in and out of gear, (see figs. 4 and 5.) $A^2$ $A^3$ and $A^4$, shown in figs. 1 and 4, are gear-wheels of different diameters, arranged on a shaft $A^5$. The shaft $A^5$ is placed in the frame of the machine in a position parallel to the axle $x$, so as to place the gear-wheels in a proper position to be thrown in and out of gear with the wheel A on the axle. The sliding-block M is arranged in the frame of the machine, in front of the axle $x$, on the rods I and I$^1$, which lie parallel with the axle $x$. The jaws of the block are extended over the axle, one on each side of the lever L, and fitted closely to the lever, and serve to move it with the wheel A along the axle in shifting the pinion A$^1$ to change the gear. The block is provided with a side-board or projection E, placed on one side of the block, extending upward sufficiently high to form a segment of a circle, in which are holes or recesses, which form receptacles for the projecting end of the lever L$^1$, which fits into them, and serves to hold the lever L in position, thus holding the pinion A$^1$ in or out of gear with the gear-wheels on the shaft A$^5$. The block M serves to move the wheel A on the axle, and to hold the lever L in position. When the speed of the rake is to be changed, to increase or diminish the size of the sheaf, it is done by grasping the top ends of the levers L and L$^1$ in the hand, pressing them together, which unlocks the lever L$^1$ from the recess in the side-board E, and permits the lever to move round the axle, thus throwing the pinion A$^1$ out of gear; then by pressing on the pin V, which presses down the spring G, and unlocks the block from the rod I$'$, the block may be moved, moving the wheel A and pinion A$^1$ to the desired position; the spring G throws its point into a notch in the under side of the rod I, and locks the block so that it cannot move until it is unlocked by pressing down the spring; the levers are grasped at the top, which unlocks the lever L$^1$; the tops of the levers are then thrown forward, which places the pinion A$^1$ in gear with a wheel on the shaft B$^5$. The end of the lever L$^1$ drops into one of the holes or recesses in the projection E, and locks the lever L, thus holding the pinion A$^1$ in gear; by this means the rake may be stopped or started, at the will of the operator, and the movements of the rake can be changed to suit different kinds of grain, and also to increase or diminish the size of the sheaf, when the grain is heavy or light, as the case may be. In fig. 1 the pinion A$^1$ is represented as being in gear with the small gear-wheel A$^2$. The three wheels A A$^1$ and A$^2$ being all of the same diameter, and having the same number of teeth or cogs when geared together, causes the rake to deliver a sheaf to every revolution of the driving-wheels, which may make a sheaf sufficiently small for the heaviest grain, but could be made to work faster and make smaller sheaves by making the wheel A$^2$ smaller in diameter; the wheel A$^3$ being once and a half larger than the pinion A$^1$, and having once and a half the number of teeth, causes the rake to deliver a sheaf at every revolution and a half of the driving-wheel; the wheel A$^4$ being twice the diameter of the pinion, and having twice the number of teeth, causes the rake to deliver a sheaf at every two revolutions of the driving-wheels. The number of gear-wheels on the shaft B$^5$ may be increased or diminished, and their diameter changed if desired or found to be necessary. A$^6$ is a crank on the end of the shaft A$^5$; the wrist of the crank has a sleeve or roller which turns on the wrist, for the purpose of diminishing friction; the roller is made with a flange on its end, which fits into the yoke A$^7$, and holds the yoke on the wrist, and permits the yoke to vibrate on the rod A$^8$ when the wrist of the crank is working in the slot in the yoke. The yoke is made with lugs on its lower end, having eyes or holes through them, through which passes the rod A$^8$; the yoke is secured in its position on the rod by means of collars which are fastened to the rod, and prevents the yoke from moving lengthwise on the rod, but permits it to turn around, vibrating on the rod when moving forward and backward; by this arrangement, the yoke and rod can work freely, without interfering with the rotating of the crank. The rod is held in position at its forward end by passing through a hole in the projection P, and at its rear end by the end of the vibrating arm A$^9$, to which it is attached by a hinge or vibrating joint. The projection P is fastened to the under side of the connecting-bar C$^1$, near its top end. The vibrating arm A$^9$ is pivoted near its middle to the under side of the bar C, which is hinged to the frame of the machine at its top end, and to the platform at its lower end. The arm A$^9$ is attached to the bar or link B by a double vibrating joint, thus making the connection of the parts of the apparatus on the frame of the machine with the parts under and on the platform, (see fig. 3.) The bar B is attached to the bar B$^1$ by a vibrating joint; B$^1$ is pivoted to the platform, at a distance from the end attached to the bar B, of near one-fourth its length, (pivot marked F,) and at its other end to the bar B$^4$. The bar B$^2$ is pivoted at one end to the platform, (pivot marked H,) and at the other end to the projection from the bar B$^4$; one end of the bar B$^3$ is pivoted to the bar B$^2$, at a distance from the inner end of the bar B$^2$ of near three-fifths its length; the other end of the bar B$^3$ is pivoted to the end of the crank B$^5$, which is attached to and turns the post B$^6$; the lower end of the post B$^6$ is pivoted on the end of the arm B$^4$, and is turned on the same by the crank B$^5$, (see fig. 6.) The end of the rake B$^7$ is jointed to the top of the post B$^6$ and is turned and operated by the same. B$^8$ is a roller, on a projection from the end of the rake, which serves to elevate the rake while making its ineffective stroke, and also to hold it down to the platform while making its effective stroke, (see fig. 2.) The devices by which the rake is elevated and carried to the front of the platform are shown in figs. 1 and 2. S is a switch, forming an inclined plane, starting from the floor of the platform and rising to the top of the track T; the track T is a board standing on its edge on the side of the platform, and serves as a track to carry the roller B$^8$, which holds the rake in an elevated position while passing to the front of the platform, and also serves as a side-board to prevent the grain from getting into the wheel or into the slot O; the roller B$^8$ passing forward over the switch S$^1$ presses it down and forms a bridge, which carries the roller over the cut or opening in the side-board; the switch S$^1$ making a continuation of the track T; when the roller has passed forward off the end of the switch, the switch springs up, opening the cut in the side-board: the roller rests on the end of the board T$^2$ until the motion is reversed and the rake starts back to make its effective stroke; the roller B$^8$, rolling off the end of the board T$^2$, passes down through the cut or opening in the sideboard, passing to the inside of the track T, causing the rake to descend to the platform; the roller rolls back to the rear, bearing against the edge of the track or board T$^1$, which serves to hold the rake down to the platform while making its effective stroke. T$^1$ is a board laid flat on the platform, along the inside of the track T, its edge forming a bearing for the end of the roller, while the rake is making its effective stroke, holding the rake down to the platform. When the rake has finished its effective stroke, the roller B$^8$ has opened the switch S, and passed out from behind it, the spring S$^2$ causes the switch to spring back to its place, falling in behind the roller and forming an inclined plane, which carries the roller up to the top of the track T, thus elevating the rake, (see fig. 2,) preparatory to its forward movement. When the rake starts to make its effective stroke it is thrown down to the platform and immediately moves back over it, not stopping in the way of the falling grain. The box K is fastened to the platform or made in it, and serves to protect the apparatus, which works underneath the platform; the apparatus may be pivoted to the bottom of the box or to the platform. O is a slot in the platform to permit the post $B^6$ to move forward and backward, from the front to the rear of the driving-wheel, when the machine is in motion.

Having given a detailed description of the construction and uses of the different parts of the apparatus, I will proceed to describe its operation.

When the machine is in motion the axle $x$ turns forward, turning the wheel A with it, which being in gear with the wheel $A^1$, causes it to turn backward, giving it a reversed motion to that of the wheel A; when the wheel $A^1$ is in gear with either of the gear-wheels on the shaft $B^5$, being on the under side of the gear-wheels and turning backward, it causes the shaft to turn forward, which turns the crank $A^6$ forward, carrying the yoke $A^7$ and rod $A^8$ with it; the rod $A^8$ being hinged to the top of the arm $A^9$ draws the top of the arm with it. The arm $A^9$ is pivoted near its middle to the connecting-bar C; when the top of the arm is drawn forward it swings on its pivot, and causes the lower end of the arm to move backward, drawing the bar B with it; the bar B is hinged to the end of the bar $B^1$, and draws the inner end of the bar $B^1$ back also; the bar $B^1$ being pivoted to the platform swings on its pivot, causing the outer end to move forward toward the front of the platform, carrying the outer end of the bar $B^4$ with it; the bar $B^4$ being pivoted at its bend or elbow to the outer end of the bar $B^1$, and at the end of its projection, to the bar $B^2$, is operated by the bars $B^1$ and $B^2$; the bar $B^2$ being hinged at its inner end to the platform or bottom of the box K, and at its outer end to the end of the projection from the bar $B^4$. When the inner end of the bar $B^1$ is moved backward toward the rear of the platform, it swings on its pivot, its outer end moving forward, moving the bars $B^4$ and $B^2$ forward with it. The bar $B^2$ holding out the end of the projection on the bar $B^4$, causes the bar $B^4$ to swing on its pivot on the end of the bar $B^1$, which causes the inner end of the bar $B^4$ to move forward, carrying the crank $B^5$ with it, which also carries and operates the rake in its forward movement or ineffective stroke; the bar $B^3$ being fastened to the bar $B^2$ at one end, and to the crank $B^5$ at the other. When the rake is being moved forward by the end of the bar $B^4$, the bar $B^3$ pushes the end of the crank around, causing the post $B^6$ to turn on the end of the bar $B^4$; when the post is carried to the front of the platform, it is turned sufficiently to cause the rake to fall across the front of the platform. When the movement of the yoke is reversed, the rod $A^8$ moves backward, moving the upper end of the arm $A^9$ back, and causes the lower end of the arm to move forward, which moves the bar B and the inner end of the bar $B^1$ forward; the bar $B^1$ swinging on its pivot, its outer end moves backward toward the rear of the platform; the bar $B^4$, being pivoted on the end of the bar $B^1$, is moved back also; the bar $B^2$, being pivoted to the projecting end of the bar $B^4$ at one end, and to the platform at the other, causes the bar $B^4$ to swing on its pivot on the end of the bar $B^1$, moving its inner end, to which the post $B^6$ and rake are attached, back toward the rear of the platform, the rake making its effective stroke; the bar $B^2$ acting on the crank $B^5$, pulls it around and causes the post $B^6$ to turn, which turns the rake, causing the outer end of the rake to swing around, performing a quarter of a circle, or nearly so, while moving from front to rear of the platform, making its effective stroke, thus sweeping the grain off at one side of the platform, in rear of the driving-wheels. The apparatus working underneath the platform is not exposed, being covered by the platform, and protected by the floor and sides of the box K, which keep out the dirt or stubble from the working parts of the apparatus. The bars lying on their sides in the box K do not shake like upright machinery, and are not liable to get out of order, the rake being the only piece of machinery that is elevated, but not having a handle, it is not heavy and does not require much power to operate it. The bars are so arranged in the box K as to cause the post $B^6$ to move in the straight slot O, at the side of the platform, causing the end of the rake attached to the post $B^6$ to move from the front to the rear of the wheel while the other end of the rake is swinging around over the platform. This movement will be understood by referring to figs. 2 and 3. When the post $B^6$ is moving backward and forward in the slot O, it is being turned by the crank $B^5$, as before explained. When the rake moves forward, the roller $B^8$ rolls up the switch S on to the track T, elevating the rake. The rake being in an elevated position, the roller $B^8$ crosses over the opening in the track or side-board on the switch or bridge $S^1$, and moves on to the end of the side-board marked $T^2$, where it rests and prevents the rake from descending to the platform until the movement is reversed; when the rake starts to move backward, the roller rolls off the end of the side-board, passing through the opening, and the rake descends to the platform, falling into the butts of the grain, and continuing to move back over the platform in its effective stroke, sweeping the grain from the platform. When the rake has performed its effective stroke the roller $B^8$, having opened the switch S, and passed out from behind it, the switch springs back into its place, falling in behind the roller; when the rake moves forward the roller rolls up the switch, the top of which forms an inclined plane, on to the track T, elevating the rake, and rolls forward on the track T, and over the switch $S^1$, on to the end of the board $T^2$, bringing the rake to the front of the platform, (see fig. 2.)

Having thus described my invention, what I claim as new, and desire to secure by Letters Patent, is—

1. The gear-wheels A $A^1$ $A^2$ $A^3$ and $A^4$, shaft $B^5$, crank $B^6$, lever L and $L^1$, and block M, arranged to operate in the manner and for the purpose substantially as described.

2. The yoke $A^7$ and $A^8$, and vibrating arm $A^9$, arranged to operate in the manner and for the purpose substantially as described.

3. The bars or levers B $B^1$ $B^2$ $B^3$ and $B^4$, crank $B^5$, and post $B^6$, with the rake $B^7$, attached, arranged and operating in the manner and for the purpose substantially as described.

4. The switch S, and tracks T and $T^1$, arranged on the side of a circular platform, to operate in the manner and for the purpose substantially as described.

5. The rake head $B^7$, hinged or jointed to the reciprocating and turning post $B^6$, arranged and operating substantially as and for the purpose described.

6. The arrangement, beneath the grain platform, of the mechanism for communicating motion to a reciprocating turning and lifting rake, which operates from above, upon the platform, substantially as described.

WM. F. GOODWIN.

Witnesses:
    A. W. BROWNE,
    A. FOSTER.